Patented Sept. 13, 1938

2,129,995

UNITED STATES PATENT OFFICE 2,129,995

SAPONIFICATION OF ORGANIC ESTERS OF CELLULOSE

Henry Dreyfus, London, England

No Drawing. Application September 5, 1935, Serial No. 39,287. In Great Britain September 17, 1934

5 Claims. (Cl. 8—20)

This invention relates to improvements in the manufacture of artificial materials, and particularly to improvements in processes for the saponification of artificial materials containing cellulose acetate or other organic esters of cellulose.

The saponification of artificial materials containing cellulose acetate or other organic ester of cellulose is well-known and is, in general, carried out by treating them with media containing caustic soda or other suitable basic substance, for example sodium silicate, ammonia or organic bases. The saponification of the materials may be carried to a stage in which all the ester groups are removed, or only a partial saponification of the cellulose ester may be effected. The object of the present invention is to provide a simple means of ascertaining visually when the saponification has proceeded to the desired extent.

According to the present invention saponification is allowed to proceed until a colour change, due to the presence of a colouring agent having different affinities for the saponified and the unsaponified ester, has progressed to a predetermined degree, and thereafter removing the colour due to the presence of said colouring agent from the ester.

The dyestuffs employed according to the present invention may be dyes which, while they have little or no affinity for the organic ester forming the basis of the artificial material, have an affinity for regenerated cellulose, are resistant to alkali under the conditions employed in the saponification treatment, and can subsequently be stripped from the partially saponified material. When such dyestuffs are incorporated in the saponifying medium the progress of the saponification will be marked by a gradual colouring of the artificial materials, the depth of colour increasing as the degree of saponification increases. When the shade reaches the depth corresponding to the degree of saponification required, which may be determined by comparing the material being saponified with a previously prepared standard, saponification may be interrupted and the materials washed and dried.

The invention is most valuable in the saponification of artificial materials by batch processes, for example in the form of hanks, cops or other packages. In this method it is necessary only to immerse the materials in the saponifying medium and maintain them there until they have acquired the desired shade.

As stated above, any suitable dyestuffs may be employed which have an affinity for regenerated cellulose but have little or no affinity for the organic ester forming the basis of the artificial materials being saponified, and which are resistant to alkali and can be stripped from the materials after saponification. Examples of such dyestuffs are Benzoazurine G (Colour Index No. 502)
Benzopurpurin 4B (Colour Index No. 448)
Congo Orange R (Colour Index No. 459)
Direct Steel Blue BB (Colour Index No. 465)
Benzo New Blue 5B (Colour Index No. 466)
Chicago Blue R (Colour Index No. 474)
Direct Brilliant Blue G (Colour Index No. 508)
Direct Brown M (Colour Index No. 420)

Stripping may be carried out continuously with or immediately after saponification or at any subsequent time. Any suitable stripping agent may be employed, e. g. sodium hydrosulphite. Preferably the dye should be one which can be discharged effectually without the use of a leucotrope.

The following example illustrates the invention:—

Example

A cellulose acetate fabric is saponified in a bath comprising a 1–3% aqueous solution of caustic soda to which has been added 10% of sodium sulphate and .5–1% of benzopurpurin 4B, both calculated on the weight of the fabric.

From time to time test portions of fabric are removed and rinsed, dried, and compared with a series of standards consisting of samples of the same fabric which have been saponified to various predetermined degrees, and subsequently dyed under the same conditions as the fabric which is to be saponified.

Saponification is continued until a sample, after rinsing and drying, exhibits substantially the same shade as the standard which has been saponified to the desired extent.

In a similar way other suitable cotton dyes, for instance any of those referred to above, may be employed.

The principle of the present invention may also be carried into effect by dyeing the materials having a basis of an organic ester of cellulose before the saponification process with a dyestuff which has no affinity for cellulose and which will dissolve out from the regenerated cellulose portion of the materials into the alkali medium. Examples of such dyestuffs are mono-carboxylic and mono-sulphonated azo dyestuffs having an affinity for cellulose acetate or the other organic ester of cellulose concerned. According to this modification of the process the saponification may be carried out until the original shade of the cellulose ester materials has decreased until it reaches a standard shade.

While the present invention is of particular importance in relation to the saponification of artificial materials containing cellulose acetate, it may also be employed in the saponification of materials containing other organic esters of cellulose, including mixed esters and ether-esters, for example cellulose acetate-propionate, cellulose propionate, cellulose butyrate, ethyl cellulose acetate and oxy-ethyl cellulose acetate.

What I claim and desire to secure by Letters Patent is:—

1. Process for the saponification of organic esters of cellulose, comprising treating the ester with a saponifying medium until a color change, due to the presence in the saponifying medium of a coloring agent having different affinities for the saponified and the unsaponified ester, has progressed to a predetermined degree, thereupon interrupting the saponification, and thereafter removing the color due to the presence of said coloring agent from the ester.

2. Process for the saponification of filaments, threads, ribbons, films and like materials having a basis of an organic ester of cellulose, comprising treating the materials with a saponifying medium containing a coloring agent which has an affinity for regenerated cellulose but none for the cellulose ester until the materials have become colored to a predetermined shade by said coloring agent, thereupon interrupting the saponification, and thereafter removing the color due to said coloring agent from the materials.

3. Process for the saponification of filaments, threads, ribbons, films and like materials having a basis of an organic ester of cellulose, comprising treating the materials with a saponifying medium containing a cotton dye capable of discharge by reduction which has an affinity for regenerated cellulose but none for the cellulose ester until the materials have become colored to a predetermined shade by said dye, thereupon interrupting the saponification, and thereafter discharging said dye by treating the materials with a reducing agent.

4. Process for the partial saponification of filaments, threads, ribbons, films and like materials having a basis of cellulose acetate, comprising treating the materials with a saponifying medium containing an amount of the saponifying agent greater than that required to effect saponification to a predetermined degree and a coloring agent which has an affinity for regenerated cellulose but none for the cellulose acetate, until the materials have become colored to a predetermined shade by said coloring agent, thereupon interrupting the saponification, and thereafter removing the color due to said coloring agent from the materials.

5. Process for the partial saponification of filaments, threads, ribbons, films and like materials having a basis of cellulose acetate, comprising treating the materials with a saponifying medium containing an amount of the saponifying agent greater than that required to effect a predetermined degree of saponification, and a cotton dye capable of discharge by reduction, which has an affinity for regenerated cellulose but none for the cellulose acetate, until the materials have become colored to a predetermined shade by said dye, thereupon interrupting the saponification, and thereafter discharging said dye by treatment with a reducing agent.

HENRY DREYFUS.